(12) United States Patent
Wunder et al.

(10) Patent No.: US 7,675,894 B2
(45) Date of Patent: Mar. 9, 2010

(54) METHOD FOR SENDING CHANNEL QUALITY INFORMATION IN A MULTI-CARRIER RADIO COMMUNICATION SYSTEM, CORRESPONDING USER TERMINAL AND BASE STATION

(75) Inventors: Gerhard Wunder, Berlin (DE); Zhou Chan, Berlin (DE); Stephen Kaminski, Eislingen (DE); Hajo Bakker, Eberdingen (DE)

(73) Assignee: Alcatel Lucent, Paris ( * ) Notice: Subject to any disclaimer, the term of this patent is extended or adjusted under 35 U.S.C. 154(b) by 435 days.

(21) Appl. No.: 11/582,335

(22) Filed: Oct. 18, 2006

(65) Prior Publication Data

US 2007/0110100 A1 May 17, 2007

(30) Foreign Application Priority Data

Nov. 15, 2005 (EP) ................................. 05300922

(51) Int. Cl.
*H04W 72/08* (2009.01)
(52) U.S. Cl. ........................ 370/343; 370/203; 370/204; 370/206; 370/207; 370/208; 370/210; 370/340; 370/341; 370/465; 370/468; 455/69; 455/450; 455/452.1; 455/452.2; 375/260
(58) Field of Classification Search ................. 370/203, 370/204, 206, 207, 208, 210, 340, 341, 343, 370/465, 468; 455/69, 450, 452.1, 452.2; 375/260
See application file for complete search history.

(56) References Cited

U.S. PATENT DOCUMENTS

| 4,982,162 | A | * | 1/1991 | Zakhor et al. ............... 324/312 |
| 5,579,437 | A | * | 11/1996 | Fette et al. ................... 704/262 |
| 6,088,327 | A | * | 7/2000 | Muschallik et al. ......... 370/210 |
| 7,047,006 | B2 | * | 5/2006 | Classon et al. .............. 455/434 |
| 2002/0018527 | A1 | | 2/2002 | Vanderaar et al. |
| 2003/0148780 | A1 | * | 8/2003 | Takano ....................... 455/522 |
| 2003/0218973 | A1 | | 11/2003 | Oprea et al. |
| 2004/0203477 | A1 | * | 10/2004 | Carballo et al. ............... 455/69 |
| 2005/0058095 | A1 | * | 3/2005 | Sadri et al. .................. 370/329 |
| 2005/0157801 | A1 | * | 7/2005 | Gore et al. .................. 375/260 |
| 2007/0104087 | A1 | * | 5/2007 | Tee et al. .................... 370/208 |

OTHER PUBLICATIONS

Graps, Amara, An Introduction to Wavelets, 1995, IEEE Computational Science & Engineering, Summer 1995, pp. 50, 54-55.*

(Continued)

*Primary Examiner*—Dwayne Bost
*Assistant Examiner*—Christopher Henry
(74) *Attorney, Agent, or Firm*—Fay Sharpe LLP

(57) ABSTRACT

The present invention relates to a method for gaining channel quality information at a base station of a multi-carrier radio communication system having a plurality of orthogonal frequency sub-carriers.

According to the present invention, the method comprises the steps of:
 measuring a Channel Frequency Response at a user terminal of said multi-carrier radio communication channel;
 extracting samples of said Channel Frequency Response represented in the frequency domain at a predefined oversampling factor;
 sending said samples on a signaling channel from said user terminal to said base station;
 performing a windowing operation on the received samples in the time domain;
 determining a channel quality information for each of said sub-carriers on a representation in the frequency domain of said received samples after windowing operation.

18 Claims, 3 Drawing Sheets

OTHER PUBLICATIONS

Isaacson, Eugene and Keller, Herbert Bishop, Analysis of Numerical Methods, 1966, Dover Publications, Inc, 1994 Publication, pp. 229-242.*

Smith, Steven W, The Scientist and Engineer's Guide to Digital Signal Processing, 1997, California Technical Publishing, First Edition, pp. 39-66.*

* cited by examiner

METHOD FOR SENDING CHANNEL QUALITY INFORMATION IN A MULTI-CARRIER RADIO COMMUNICATION SYSTEM, CORRESPONDING USER TERMINAL AND BASE STATION

The invention is based on a priority application EP05300922.1 which is hereby incorporated by reference.

TECHNICAL FIELD

The present invention relates to a method for optimizing the use of the feedback channel in multi-carrier systems.

BACKGROUND OF THE INVENTION

Such multi-carrier systems often implement Orthogonal Frequency Division Multiplexing (OFDM) as multi-carrier transmission technique. OFDM is for example used in the HIPERLAN/2 standard as well as an extension of the IEEE 802.11 a standard for the 5 Ghz area. OFDM could also offer a sensible alternative for high-speed mobile applications, and thus represents an important step for next generation mobile radio systems or for a $4^{th}$ generation air interface. To this extend, the $3^{rd}$ Generation Partnership Project (3GPP), for the standardization of high-speed broadband wireless mobile communication systems, is recently considering the application of OFDM techniques for the high speed data packet access (HSDPA) air interface communication between the radio access network (RAN) and the user terminal (UE).

In multi-carrier systems as OFDM transmission system, the transmitted data is split into a number of parallel data streams, each one used to modulate a separate sub-carrier. In other words, the broadband radio channel is subdivided into a plurality of narrow-band subchannels or sub-carriers being independently modulated with e.g. QPSK, 16 QAM, 64 QAM or higher modulation order allowing higher data rate per sub-carrier.

In such OFDM systems, the sub-carrier frequencies can be allocated to a user channel on a short term basis (e.g. all 2 ms) as well the modulation order per sub-carrier defining a transmission channel for each user should be updated on the same short term basis.

A very important task of such multi carrier systems to provide for an efficient sub-carrier/modulation allocation to the different users. This is necessary to optimize and extend the performance of the multi-carrier system.

On the one hand, the selection of the best appropriate sub-carrier for each user should take into account that in mobile environment with multipath radio channels some sub-carriers may be subject to very strong channel attenuation when seen by a given user. Such sub-carriers would be useless allocated to this user because of fading. On the contrary they may be received with good quality by other users.

On the other hand, when the best appropriate sub-carriers are identified for a user, the optimal modulation to be used on these sub-carriers should be appropriately selected. The higher modulation orders can only be used if the signal to noise ratio (SNR) at the receiver is high enough to allow the demodulation.

All this optimization requires exchange of signaling/measure information in a feedback channel, so that the entity of the network which is responsible for resource allocation, respectively for modulation selection (e.g. the base station or Node B) disposes of quality measures performed at the different user equipments (UE).

In HSDPA (High Speed Downlink Packet Access) systems, only one channel quality measure is transmitted from the user terminal to the base station. This channel quality information CQI is defined in 3GPP standards, 3GPP 25.214 and 3GPP 25.211. The channel quality information is however not accurate enough for multi channel systems In the ideal case, each user terminal should make a channel quality measurement for each sub-carrier and report it on the feedback channel to the Node B. The drawback is that this would represent a huge amount of signaling information (some Mbits) especially in multi carrier system with up to thousands of sub-carriers.

A particular object of the present invention is to provide a method for sending feedback information regarding the channel quality in a more efficient way so that the amount of feedback information is reduced but anyway sufficient for performing an efficient resource allocation in the multi carrier system.

Another object of the invention is to provide a corresponding user terminal and base station.

SUMMARY OF THE INVENTION

These objects, and others that appear below, are achieved by a method for gaining channel quality information in a multi-carrier radio communication system according to claim 1, a user terminal according to claim 8, and a base station according to claim 9.

According to the present invention, detailed and reliable channel quality information about the Channel Frequency Response of the radio channel are gathered at the base station. The channel quality information is compressed and sent with redundancy by the user terminal to the base station over the feedback channel. The base station decodes this information, minimizes the reconstruction error using the redundancy and reconstructs a faithful Channel Frequency Response as measured at the user terminals. Then, the representation of this Channel Frequency Response is converted in the frequency domain to deduce a channel quality indicator for the different sub-channels constituting the multi-carrier system.

The method according to the present invention presents the advantage to reduce the signaling load on the feedback signaling channel while having a very fine frequency resolution. This results in an efficient resource allocation leading to an increased throughput in the network.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF PREFERRED EMBODIMENTS

Figure 1:
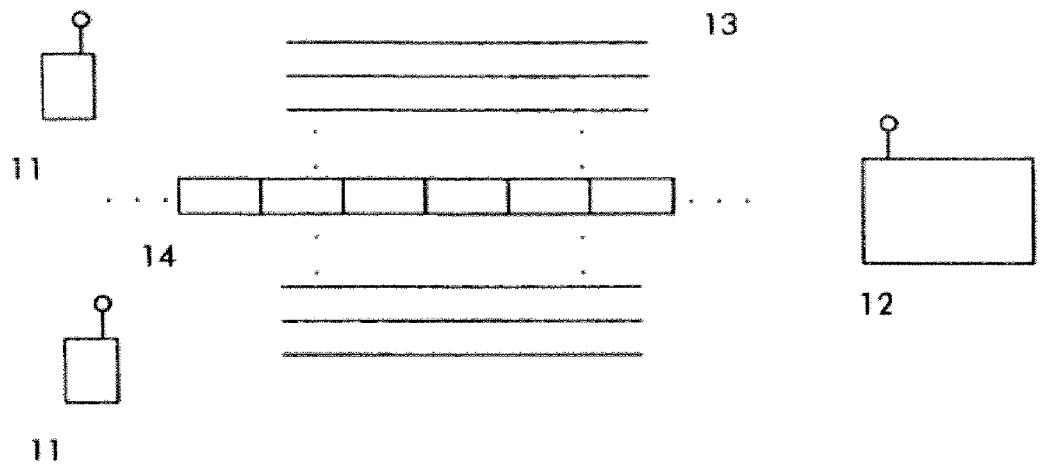
FIG. 1 shows an illustration of a network using multi-carrier transmission in the downlink.

FIG. 1 shows an illustration of a network using multi-carrier transmission in the downlink and a feedback signaling channel in the uplink. User terminals 11 are receiving multi-carrier frequency signals in the downlink from base station 12 over a plurality of sub-carriers 13. On the uplink, user terminals 11 send signaling information to base station 12 on a feedback signaling channel 14.

The multi-carrier network may comprises 256, 512 or up to thousands of sub-carriers which are allocated to user terminals 11. Preferably, several sub-carriers 13 are allocated to each user terminal 11 in order to match the high throughput received from base station 12 in the downlink. The frequency separation between the sub-carriers is chosen so that the sub-carriers are orthogonal to one another (i.e. the data transmitted on one sub-carrier is not causing interference on the data sent on the other sub-carriers).

The feedback channel 14 may be advantageously implemented according to HSDPA (High Speed Downlink Packet Access) specification where the channel quality information according to the invention are sent back from the user terminals 11 to the base station 12 over a HS-DPCCH (High speed dedicated Physical Control Channel) having a capacity of around 1500 bit/s.

Figure 2:
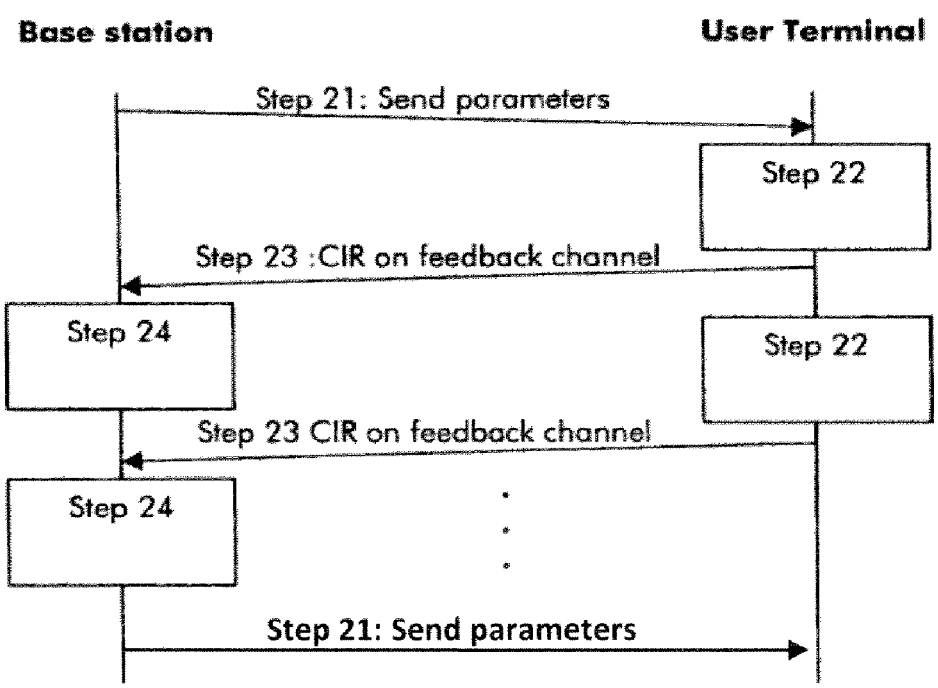
FIG. 2 shows an example representing the communication between a user terminal and a base station according to the present invention.

FIG. 2 shows a flow diagram representing the communication between the user terminal 11 and the base station 12 as well as the steps performed according to the present invention.

At step 21, base station 12 informs user terminal 11 on parameters which should be used for performing the method according to the present invention. These parameters will be addressed in the following At step 22, user terminal 11 performs steps 31 to 33 which will detailed in connection with FIG. 3 in order to generate Channel Frequency Response information to be sent on the feedback signaling channel to base station 12.

At step 23, user terminal sends the Channel Frequency Response information on the feedback channel.

At step 24, base station 12 performs steps 34, 341 to 343 and 35 which will detailed in connection with FIG. 3 in order to gain reliable channel quality information for all sub-carriers of the multi-carrier system Steps 22 to 24 are repeated at regular time intervals in order to track the change of the channel quality.

Then, the method starts from the beginning when base station 12 detects that new parameters would be better adopted to the new channel conditions.

Figure 3:
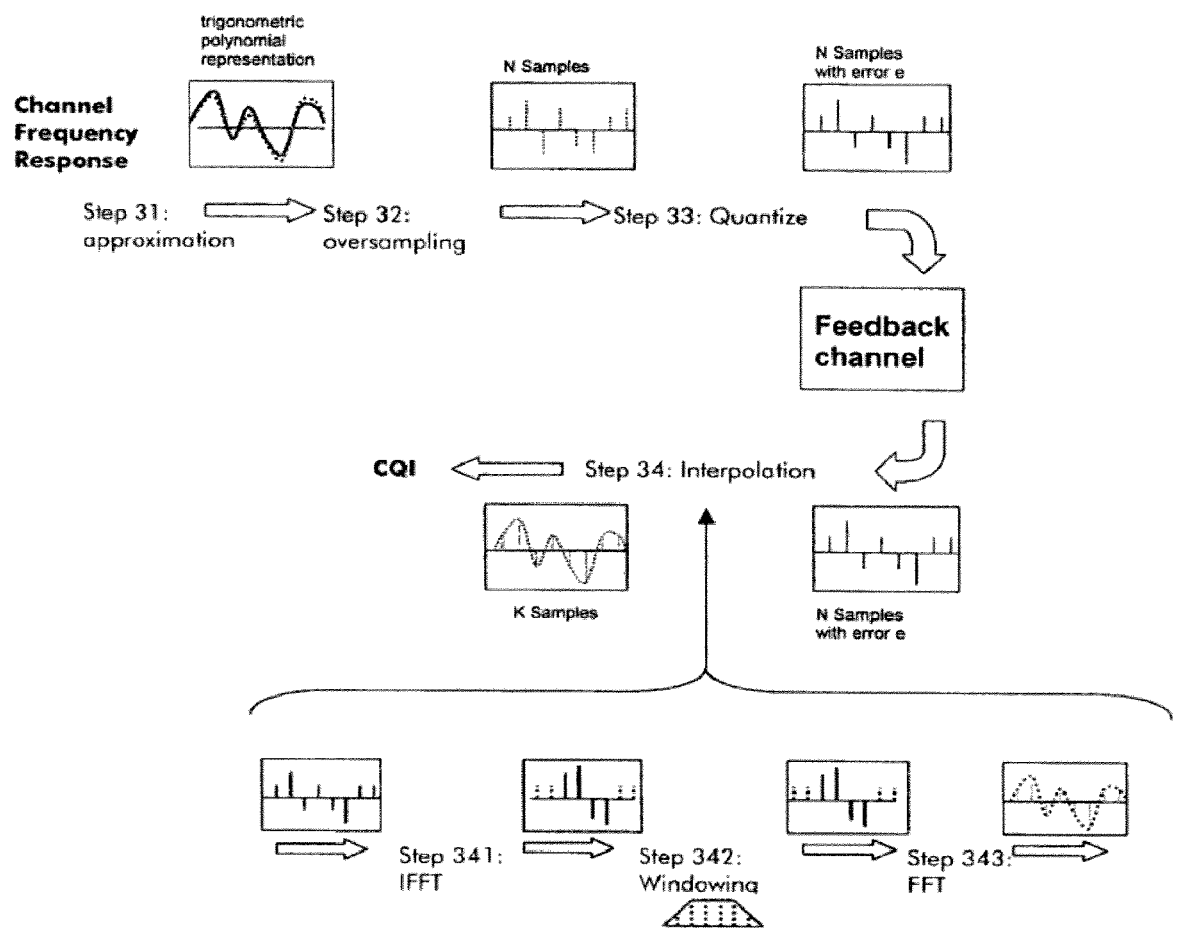
FIG. 3 details the different steps of the method performed at user terminal 11 and at base station 12 according to the method of the present invention.

FIG. 3 details the different steps of the method performed at user terminal 11 and at base station 12.

According to the present invention, user terminals 11 are measuring channel frequency responses (CFR) on the entire frequency band of the system. These measurements are performed using prior art methods well known for the persons skilled in the art. These measurements are preferably performed at regular time interval. The Channel Frequency Response is measured in the frequency domain. Alternatively, a channel impulse response may be measured in the time domain and transformed in the frequency domain using a Fast Fourier Transformation in order to obtain a channel frequency response.

Then, the channel frequency response is approximated by preferably a real trigonometric polynomial of degree L (step 31), where L is a predefined constant to provide a reliable accuracy after the approximation. Other approximation functions such as Wavelets are also possible. The 2L+1 coefficients of the real trigonometric polynomial are found using e.g. a least-squares based approximation (Alternative 1) or a linear programming based algorithm (Alternative 2).

Alternative 1: The least-squares based algorithm minimizes the sum of quadratic errors at the frequency positions corresponding to each sub-carrier. The searched coefficients are obtained by the matrix multiplication: $x^*=Q \cdot b$ where $Q$ is a constant matrix defined as $Q=(A^T \cdot A)^{-1} A$, where $A$ is the matrix of trigonometric terms $$A = \begin{pmatrix} \frac{1}{2} & \cos\omega_0 & \cdots & \cos L\omega_0 & \sin\omega_0 & \cdots & \sin L\omega_0 \\ \vdots & & & \ddots & & & \vdots \\ \frac{1}{2} & \cos\omega_{K-1} & \cdots & \cos L\omega_{K-1} & \sin\omega_{K-1} & \cdots & \sin L\omega_{K-1} \end{pmatrix}$$

and b consists of the SIR measurements of the CHANNEL FREQUENCY RESPONSE at the sub-carrier positions.

Alternative 2: The linear programming based algorithm minimizes the maximum error at the frequency positions corresponding to each sub-carrier. This minimization problem can be posed as a common linear programming problem and thus can be solved using many well-known algorithms.

In step 32, a predefined N where N must be greater or equal to the number of samples are extracted from the real trigonometric polynomial. The number N is the predefined oversampling number which must be equal or greater than the total number of the coefficients 2L+1 of the real trigonetric polynomial. This oversampling introduces redundancy which can be used at the receiver (i.e. base station 12), e.g. to minimize the error probability of the reconstructed channel frequency response at the receiver (base station 12). The number N is preferably determined at base station 12 and communicated to user terminal 11.

Preferably, the N samples are chosen equally spaced in the frequency domain corresponding to the channel frequency response frequency band. Nevertheless, base station 12 may be interested in another repartition of the n samples. In this case, base station 12 informs user terminal 11 on the position in the frequency domain where the samples should be located.

Then, the N samples are quantized (step 33) and transmitted over the feedback signaling channel 14 to base station 12. Preferably, the quantization granularity is also determined at base station 12 and communicated to user terminal 11. For compression reasons the granularity of the quantization may correspond to a number of predefined modi.

Following steps are performed at base station 12 to recover the channel frequency response and determine a channel quality indication for the different sub-carriers of the system:

Step 34 consists in sub-steps 341 to 343.

Step 341 consists in performing an inverse Fast Fourier Transformation to obtain the feedback information in the time domain. This enables it to obtain the original Channel Impulse Response and remaining terms due to oversampling. The Channel Impulse Response are not error free due to the quantization performed at the transmitter.

Step 342 consists in performing a windowing operation on the obtained channel frequency response. The windowing operation is designed to minimize the maximum error in the time domain (or another error measure) and consists preferably in a function corresponding to a constant value in a first time domain and to a linear slope in a second time domain.

Figure 4:
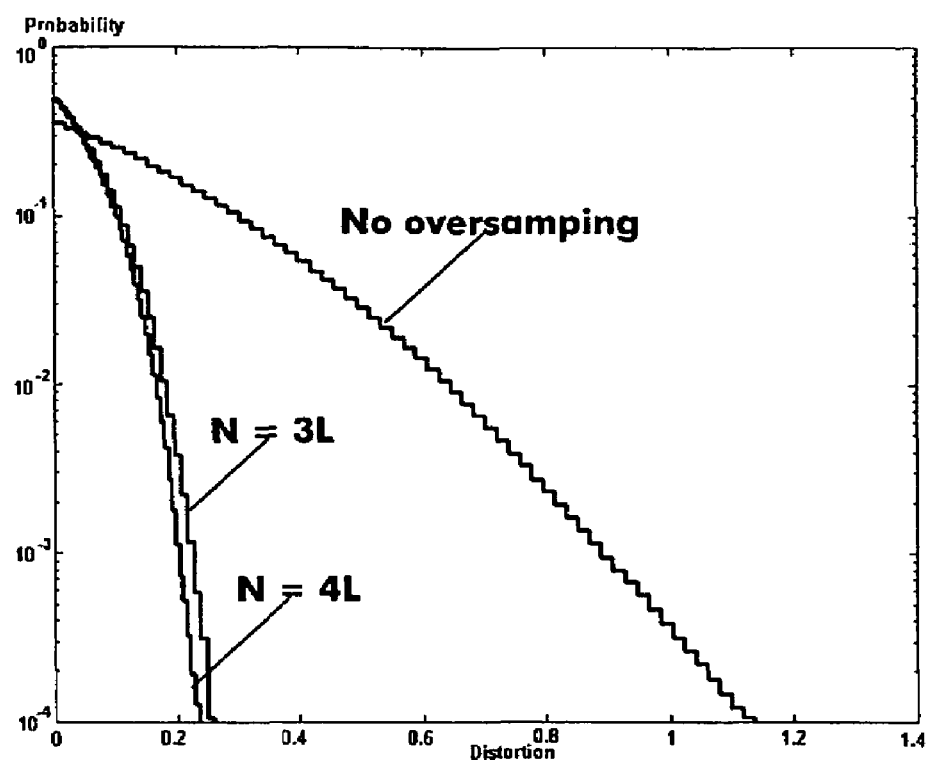
FIG. 4 shows the error bound using the oversampling and the windowing operation.

The error performance corresponding to the oversampling number N is shown in FIG. 4. The first time domain is preferably equal to the duration of the transmitted data if the channel were error free.

Step 343 consists in performing once more a Fast Fourier Transformation in order to deduce the channel quality indicator for each sub-carrier. The channel quality indicator for each sub-carrier being read on the curve representing the Fast Fourier Transformation at the frequency corresponding to each sub-carrier of the multi carrier transmission system.

The method according to the present invention is particularly advantageous in systems with a large number of sub-carriers. The original channel frequency response information is strongly compressed after the approximation at the cost of the minimized error. Instead of K—which is the original number of sub-carriers—samples only 2L+1—where L is the degree of the real trigonometric polynomial—samples are necessary for the feedback.

Furthermore the error due to quantization can be proven to be restricted to a maximum error bound thanks to the redundancy introduced by the oversampling and to the shape of the windowing function. Different windowing operation results in optimizing other error measures than the maximum error.

The method according to the present invention may be used for different purposes. First of all, this method can help optimizing the allocation of sub-carriers to the different user terminals in a way which improve the capacity in the downlink. Only sub-carriers presenting a good channel quality towards a mobile station being allocated to this user terminal.

Secondly, the method provides a precise description of the channel quality which allows the base station 12 to optimally allocate the transmission power (with e.g. the well-known waterfilling algorithm) in order to reduce the total transmission power and further the inter-cell interference.

Thirdly, the method can be used in combination with other inventions to describe the channel quality as a means to reduce the effective number of channel coefficients in combination with the reconstruction process resulting in a tightly controlled maximum error.

To summarize the method according to the present invention enables it to enhance the performance of OFDM downlink system by frequency selective resource allocation algorithm such as adaptive modulation, sub-carrier allocation or power control. According to the channel conditions reported from the user terminal to the base station, the resource can be optimally distributed to achieve maximal throughput.

The invention claimed is:

1. A method for gaining channel quality information at a base station of a multi-carrier radio communication system having a plurality of orthogonal frequency sub-carriers, said method comprising the steps of:
measuring a channel frequency response at a user terminal of said multi-carrier radio communication system;
approximating said channel frequency response;
extracting N samples of said approximated channel frequency response at a predefined oversampling factor, wherein N is determined by a base station and communicated to the user terminal introducing redundancy for minimizing the error probability of a reconstructed channel frequency response;
sending said samples on a signaling channel from said user terminal to said base station;
performing a windowing operation on the received samples after transformation in into the time domain to minimize error; and
determining a channel quality information for each of said sub-carriers of said received samples after said windowing operation and transformation into the frequency domain.

2. The method according to claim 1, wherein said channel frequency response is approximated by a real trigonometric polynomial of a predefined degree L, where L is a constant selected to provide a reliable accuracy after approximation.

3. The method according to claim 1, wherein said channel frequency response is approximated by wavelets.

4. The method according to claim 2, wherein the coefficients of said real trigonometric polynomial are calculated using a least squares based approximation.

5. The method according to claim 1, further comprising quantizing said samples sending them on a high speed data packet access (HSDPA) signaling channel.

6. The method according to claim 1, wherein said windowing operation includes multiplying said received samples with a constant if said samples are within a first time domain and with a linear function if said samples are outside of said first time domain.

7. An user terminal adapted to be used in a multi-carrier radio communication system having a plurality of orthogonal frequency sub-carriers, said user terminal comprising:
means for measuring a Channel Frequency Response;
means for approximating said Channel Frequency Response;
means for extracting N samples of said approximated Channel Frequency Response in the frequency domain at a predefined oversampling factor determined by a base station and communicated to the user terminal introducing redundancy for minimizing the error probability of a reconstructed channel frequency response; and
means for sending said samples on a signaling channel to a base station.

8. A base station adopted to be used in a multi-carrier radio communication system having a plurality of orthogonal frequency sub-carriers, said base station comprising:
means for determining an oversampling factor for use by a user terminal in extracting N samples of an approximated Channel Frequency Response in the frequency domain;
means for communicating the oversampling factor to a user terminal;
means for receiving samples of the approximated Channel Frequency Response on a signaling channel from a user terminal;
means for performing a windowing operation on the received samples after transformation into the time domain to minimize error;
means for determining a channel quality information for each of said sub-carriers of said received samples after transformation back into the frequency domain.

9. The method according to claim 4, wherein said predefined oversampling factor N is equal to or greater than the total number of the coefficients 2L+1 of said real trigonometric polynomial.

10. The method according to claim 9 wherein the N samples are chosen equally spaced in the frequency domain corresponding to the channel frequency response frequency band.

11. The method according to claim 10, wherein said base station determines a repartition of the N samples different than equally spaced in the frequency domain corresponding to the channel frequency response frequency band and informs the user terminal on the position in the frequency domain where the samples should be located.

12. The method according to claim 4, wherein the coefficients are obtained by matrix multiplication:

$x^* = Q \cdot b$, where Q is a constant matrix defined as $Q = (A^T \cdot A)^{-1} A$, where A is the matrix of trigonometric terms:

$$A = \begin{bmatrix} 1/2 & \cos\omega_0 & \ldots & \cos L\omega_0 & \sin\omega_0 & \ldots & \sin L\omega_0 \\ \vdots & & \ddots & \vdots & & & \vdots \\ 1/2 & \cos\omega_{K-1} & \ldots & \cos L\omega_{K-1} & \sin\omega_{K-1} & \ldots & \sin L\omega_{K-1} \end{bmatrix}$$

and, where b consists of the SIR measurements of the channel frequency response at the subcarrier positions.

13. The method according to claim 5, further comprising the base station determining the quantization granularity and communicates it to the user terminal.

14. The method according to claim 5, wherein the quantization granularity corresponds to a number of predefined modi.

15. The method according to claim 1 wherein the channel quality information for each of said sub-carriers is read on a curve representing the Fast Fourier Transformation of the frequency corresponding to each sub-carrier of the multi-carrier transmission system.

16. The user terminal according to claim 7 wherein said channel frequency response is approximated by a real trigonometric polynomial having 2L+1 coefficients calculated using a least squares based approximation, wherein said predefined oversampling factor $N \geq 2L+1$.

17. The user terminal according to claim 16, wherein the coefficients are obtained by matrix multiplication:

$x^* = Q \cdot b$, where Q is a constant matrix defined as $Q = (A^T \cdot A)^{-1} A$, where A is the matrix of trigonometric terms:

$$A = \begin{bmatrix} 1/2 & \cos\omega_0 & \ldots & \cos L\omega_0 & \sin\omega_0 & \ldots & \sin L\omega_0 \\ \vdots & & \ddots & \vdots & & & \vdots \\ 1/2 & \cos\omega_{K-1} & \ldots & \cos L\omega_{K-1} & \sin\omega_{K-1} & \ldots & \sin L\omega_{K-1} \end{bmatrix}$$

and, where b consists of the SIR measurements of the channel frequency response at the subcarrier positions.

18. The user terminal according to claim 7, wherein said means for sending said samples further comprises means for sending said samples on a high speed data packet access (HSDPA) signaling channel.

* * * * *